United States Patent Office 3,049,516
Patented Aug. 14, 1962

3,049,516
ORDERED HYDROXY-TERMINATED POLY-ETHER-BASED URETHANE COMPOSITIONS
Adolfas Damusis, Detroit, Mich., assignor to Wyandotte Chemicals Corporation, Wyandotte, Mich., a corporation of Michigan
No Drawing. Filed Mar. 26, 1959, Ser. No. 802,018
18 Claims. (Cl. 260—77.5)

The present invention relates to novel ordered hydroxy-terminated polyether-based urethane compositions which are especially useful as hydroxy-terminated urethane components for two-component polyurethane coatings or corresponding single component systems which employ as the other, or diisocyanate ingredient, a blocked isocyanate, and which are also of special utility as bodying agents for urethane coatings, particularly when it is not desired to employ thermoplastic resins for such purpose.

It is an object of the present invention to provide novel bodying agents for urethane coatings. It is a further object to provide novel and valuable ordered hydroxy-terminated urethane components for polyurethane coatings systems. A further object is the provision of such compositions which are poly-ether-based urethanes. Another object is the provision of such ordered urethane compositions which lend advantageous properties to polyurethane coatings in which they are employed as the hydroxy-terminated component or ingredient. Still another object of the invention is the provision of a process for the production of such ordered urethane compositions sequentially by the reaction of about one mol of polypropyleneether glycol with about two mols of a selected arylene diisocyanate, and reaction of the thus-produced isocyanate-terminated urethane with about two mols of a selected polyether polyol, and the products thereby produced. Other objects of the invention will become apparent hereinafter.

The foregoing and additional objects are accomplished by the provision of ordered urethane compositions of the following idealized formula:

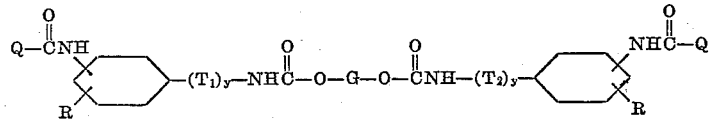

wherein R is selected from hydrogen and methyl, wherein —O—G—O— is the radical of a polypropyleneether glycol (a) having a molecular weight between about 134 and 1000, wherein $T_1$ is

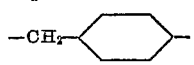

and $T_2$ is

wherein y is a number from zero to one, inclusive, and wherein Q is the same in both occurrences and is the radical of a branched polyether polyol (b) which is a propylene oxide addition product of a lower alkanol containing at least three and not more than six hydroxy groups per molecule, said urethane composition being prepared sequentially by the reaction of about one molar proportion of polypropylene ether glycol (a) with about two molar proportions of arylene diisocyanate (c) selected from the group consisting of phenylene diisocyanate, tolylene diisocyanate, and diphenylmethane-4,4'-diisocyanate, to produce an isocyanate-terminated polypropyleneether glycol urethane (I), and subsequent reaction of the isocyanate-terminated urethane (I) with about two molar proportions of the selected polyether polyol (b).

The ordered hydroxy-terminated urethane compositions of the present invention have certain advantages over ordinary hydroxyl-bearing materials such as polyesters and regular polyols. Polyurethane coatings prepared therefrom by reaction with an isocyanate-terminated component dry to touch upon evaporation of solvent, and have considerably less sagging tendency than polyurethane coating formulations incorporating regular polyols. When the ordered hydroxy-terminated urethane compositions of the present invention are reacted with an isocyanate-terminated component, the resulting polyurethane surface coatings are characterized by properties which are superior to those obtained from the same isocyanate component and previously known polyhydroxy components. The same is true when they are employed as one ingredient of a single component surface coating composition together with a blocked isocyanate as the other ingredient (for example, in baking enamels or wire coatings). This is also true for polyurethane surface coatings prepared from the ordered hydroxy-terminated urethane compositions of the invention as opposed to those prepared from random hydroxy-terminated urethane reaction products, compared to which latter a higher solid content at lower viscosity can be attained in surface coatings embodying the ordered hydroxy-terminated urethane compositions of the invention.

The ordered hydroxy-terminated urethane compositions of the present invention are prepared by reacting about one molar proportion of extending polypropyleneether glycol (a) of selected molecular weight between about 134 and 1000 and about two molar proportions of an appropriate arylene diisocyanate (c), selected from phenylene diisocyanate, 2,4-tolylene diisocyanate, 2,6-tolylene diisocyanate, including mixtures of 2,4-and 2,6-tolylene diisocyanates, and diphenylmethane-4,4'-diisocyanate, to produce a diisocyanate-terminated urethane having a free NCO group at each end of the molecule. If desired, about one molar proportion of one diisocyanate and about one molar proportion of another diisocyanate may be used. One molar proportion of this isocyanate-terminated urethane adduct is then reacted with about two molar proportions of the selected polyether polyol (b) to produce an ordered hydroxy-terminated urethane composition in which the terminal hydroxy groups are furnished by the polyether polyol molecule.

The polyether polyol (b) used in the final stage of the sequential reaction is a propylene oxide addition product of a lower alkanol, containing up to and including ten carbon atoms and containing at least three and not more than six hydroxy groups per molecule, and may be represented by the formula:

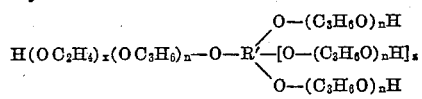

wherein R' with attached oxygen atoms represents a lower alkanol radical; x is a number from zero to one; z is a number from zero to three; and n is a number from zero to three, provided that when $z=0$, at least one n is at least one; when $z=1$, at least two n's are at least one; when $z=2$, at least three n's are at least one; and when $z=3$, at least four n's are at least one. It will be understood that x, z and n may be the same or different in each occurrence. Representative polyether polyols encompassed by this formula include the addition products of glycerine, hexanetriol, and trimethylolpropane with from one to nine mols of propylene oxide, the addition products of such polyols further reacted with one mol of ethylene oxide, the addition product of pentaerythritol with from two to twelve mols of propylene oxide, the addition products of such polyols further reacted with one mol of ethylene oxide, the addition products of dipentaerythritol and sorbitol with from four to eighteen mols of propylene oxide, the addition products of such polyols further reacted with one mol of ethylene oxide, and the like. The terminal ethylene oxide unit, when added to the polyoxypropylene chain or unit, provides a primary hydroxy group of relatively high reactivity for definite direction and precedence of reaction with NCO groups in preparing the final OH-terminated urethane from the intermediate NCO-terminated urethane.

In practice, the molecular weights of the ordered hydroxy-terminated urethane compositions of the invention, prepared in this sequential manner, have been found to be very close to the molecular weight of a composition having an idealized structure, since very little polymerization occurs using predetermined molar proportions and the sequential addition under moderate reaction conditions, viz., exclusion of moisture and initial reaction temperature not exceeding about 60° C. Also, in practice, a chain length of not greater than about 750, and preferably about 400, molecular weight has been found most advantageous for the starting polypropyleneether glycol, and a polyol having no more than an average of about two propylene oxide units added per individual chain of starting polyol is usually preferred. When the polyol (b) employed has four hydroxy groups, the polyether glycol (a) preferably has a molecular weight greater than 400. As for the isocyanate employed, tolylene diisocyanate, usually a mixture of about 80%/20% of the 2,4 and 2,6 isomers, is preferred for reasons of economy. Other variations in the starting materials to procure variations in the substituents of the ordered hydroxy-terminated urethane compositions may be usefully made to obtain polyurethane surface coatings of varying types and characteristics upon reaction with a selected diisocyanate component. For example, lengthening of the polyoxypropylene chains shown in the above formulae results in a polyurethane coating having a longer pot life, greater flexibility, and lower solvent resistance, while shortening of these polyoxypropylene chains has just the opposite effect. Flexibility of such coatings can, for example, be readily adjusted by changing the length of the polyoxypropylene chain or chains, either in the starting polypropyleneether glycol (a) or in the polyether polyol (b), or both if desired, and in general employment of products of the invention introduce a trend toward flexibility in coating compositions embodying same. The preferred equivalent weight of the hydroxy-terminated urethanes of the present invention is between about 200 and 400.

The following examples are given to illustrate the present invention but are not to be construed as limiting.

GENERAL PROCEDURE

Hydroxy-terminated urethanes, such as OH-2 of Example 1, are prepared in two stages. The adduct of polypropyleneether glycol and the selected diisocyanate is prepared in the first stage at a ratio of NCO/OH of about 2/1 and contains two free NCO groups. In the second stage, two molar proportions of polyether triol or tetraol are added to one molar proportion of the adduct in order to form a hydroxy-terminated intermediate with free OH groups on both ends of the molecule. The addition of two polyether triol molecules to the adduct changes the NCO/OH ratio to 1/2.0; two polyether tetraols to 1/2.5; two polyether pentols to 1/3.0; and two polyether hexols to 1/3.5. Dilution of the NCO-terminated intermediate at the end of stage 1 may be with any suitable non-reactive surface surface coating solvent. Many such solvents suitable in general for urethane coatings and components thereof are known in the art, for example, toluene, xylene, ethyl acetate, butyl acetate, amyl acetate, other similar esters, 2-ethoxyethyl-, 2-methoxyethyl- or 2-butyoxyethyl acetate, dioxane, ketones, chlorinated solvents, nitro-aliphatic solvents, and the like. In some instances no solvent is required during any stage of the reaction.

Polyether polyols used in the reaction are preferably stripped of water by azeotropic distillation with toluene. In this manner, the amount of water can be decreased from 0.08–0.15 to 0.02% or even less. A clean, dry, three-necked five-liter flask was used as a reaction vessel, and a nitrogen blanket was maintained over the reactants.

*Example 1* (OH-2)

| Reactants | Mols | Parts | Weight, Percent |
|---|---|---|---|
| Polypropyleneether glycol - Pluracol P-410 (M.W. 420) | 2 | 840 | 21.1 |
| Tolylene diisocyanate, TDI; 80/20; 2,4/2,6 | 4 | 696 | 17.5 |
| Polyoxypropylene derivative of trimethylolpropane-Pluracol TP-440 (M.W. 411) | 4 | 1,644 | 41.4 |
| 2-ethoxyethyl acetate or 2-butoxyethyl acetate | | 398 | 10.0 |
| Xylene | | 398 | 10.0 |
| | | 3,976 | 100.0 |

NOTE.—Ratio of reactive groups: NCO/OH=4/8=1/2.

PROCEDURE

Stage 1: Add to the 5-liter reaction vessel—

|  | Parts |
|---|---|
| TDI | 696 |
| Polypropyleneether glycol, Pluracol P-140 (M.W. 420) | 840 |

By gradual addition of polypropyleneether glycol, Pluracol P-410, the temperature of the exothermic reaction is maintained below 60° C. If necessary, cooling is applied. The reactants are stirred for 2 hours at 60° C. and then diluted with:

|  | Parts |
|---|---|
| 2-ethoxyethyl acetate | 177 |
| Xylene | 177 |

Stage 2:

|  | Parts |
|---|---|
| Add to the prepared adduct polyoxypropylene derivative of trimethylolpropane—Pluracol TP-440 (M.W. 411) | 1644 |

Increase the temperature to 80° C. and stir the reactants for 3 hours. Measure the viscosity after each hour with the Gardner Bubble Viscosimeter. When the viscosity rises over $Z_6$, dilute the content of the vessel to 80% solids with:

|  | Parts |
|---|---|
| 2-ethoxyethyl acetate | 221 |
| Xylene | 221 |

Pour the resulting OH-2 solution into a clean, dry bottle and cap it tightly in order to exclude moisture.

Properties of OH-2:
  NCO/OH _____ 1/2
  Average molecular weight _____ 1590
  Average equivalent weight _____ 398
  Hydroxyl number _____ 141
  Percent hydroxyl _____ 4.27
Properties of OH-2 solution:
  Non-volatile, percent _____ 80
  Weight per gallon, lb. _____ 8.84
  Viscosity at 25° C., cps. _____12,000–15,000

OH-2 IN URETHANE COATINGS

Two typical urethane coating formulations are presented with hydroxy-terminated intermediate OH-2 as the second component.

TWO COMPONENT URETHANE COATINGS

| Composition | Formulation | |
|---|---|---|
| | 1 | 2[1] |
| Isocyanate-terminated intermediate | [2]NCO-1 | [3]NCO-3 |
| Parts | 40 | 60 |
| Hydroxyl-terminated intermediate | OH-2 | OH-2 |
| Parts | 100 | 100 |
| NCO/OH | 1.2/1 | 1.2/1 |

[1] Numerous other organic polyisocyanates can be used as well as NCO-1 and NCO-3, such as, for example, tri TDI adduct of trimethylolpropane or hexanetriol, the phenylurethanes of any of the foregoing, TDI, MDI, and the like.
[2] NCO-1 is the NCO-terminated reaction product of three moles of TDI with one mol of TP 440 polyol (propylene oxide addition product of trimethylolpropane having a M.W. of about 410).
[3] NCO-3 is the NCO-terminated reaction product of two mols of NCO-1 with one mol of P410 polyol (propyleneether glycol, M.W. about 410).

| Properties | Formulation | |
|---|---|---|
| | 1 | 2 |
| Curing time: | | |
| Dust free, hr | 1.2 | 1.4 |
| Dry to touch, hr | 3.0 | 4.2 |
| Pot life, hr | 56 | 64 |
| Sward hardness | 40-52 | 12-38 |
| Elongation, percent | 40-70 | 200-360 |
| Tensile strength, p.s.i. | 3,600-5,000 | 1,600-4,000 |
| Impact test—Gardner, inch-lb.: | | |
| Direct | >30 | >30 |
| Indirect | >30 | >30 |
| Abrasion resistance, mg./1,000 cycles | 46 | 60 |
| Chemical resistance | (1) | (1) |
| Solvent resistance, hr.: | | |
| Toluene | >4 | >4 |
| 2-Ethoxyethyl acetate | 4 | 2 |
| Methyl isobutyl ketone | 3 | 2 |
| Water resistance: | | |
| Immersion 24 hr., 25° C | (2) | (2) |
| Immersion ½ hr., 100° C | (2) | (2) |
| Weatherometer (Twin Arc) test, 500 hr | (3) | (3) |

[1] Excellent. [2] No effect. [3] No loss of gloss.

Example 2 (OH-2A)

| Reactants | Mols | Parts | Weight, Percent |
|---|---|---|---|
| Polypropyleneether glycol-Pluracol P-410 (M.W. 420) | 2 | 840 | 19.8 |
| Tolylene diisocyanate, TDI, 80/20; 2,4/2,6 | 4 | 696 | 16.4 |
| Polyoxypropylene derivative of pentaerythritol-PE P-252T (M.W. 252) | 4 | 1,008 | 23.8 |
| 2-ethoxyethyl acetate | | 848 | 20.0 |
| Xylene | | 848 | 20.0 |
| | | 4,240 | 100.0 |

NOTE.—Ratio of reactive groups: NCO/OH=4/10=1/2.5.

PROCEDURE 696 parts of TDI are reacted with 840 parts of polypropyleneether glycol, Pluracol P-410, in a 5-liter reactor at a temperature not over 60° C. for at least 2 hours. The contents of the reactor are diluted with 142 parts of 2-ethoxyethyl acetate and 142 parts of xylene. In this first stage, an adduct with free NCO groups is produced.

In the second stage the preparation, 1008 parts of polyoxypropylene derivative of pentaerythritol, PE P-252T, are dispersed in 706 parts of 2-ethoxyethyl acetate and added at once to the adduct. The temperature is raised to 70° C. and the reactants heated for 2 hours. The contents are then diluted with 706 parts of xylene and heated for one additional hour. The viscosity is measured periodically; when it comes to a stillstand the product is bottled and capped tightly.

Properties of OH-2A:
  NCO/OH _____ 1/2.5
  Average molecular weight _____ 1272
  Average equivalent weight _____ 212
  Hydroxyl number _____ 265
  Percent hydroxyl _____ 8.17
Properties of OH-2A solution:
  Non-volatile, percent _____ 60
  Weight per gallon, lb. _____ 8.95
  Viscosity at 25° C., cps. _____ 5000-8000

OH-2A IN URETHANE COATINGS

| Composition | Formulation | |
|---|---|---|
| | 3 | 4 |
| Isocyanate-terminated intermediate | [1]U-1688-1 | [2]U-1688-2 |
| Parts | 90 | 150 |
| Hydroxyl-terminated intermediate | OH-2A | OH-2A |
| Parts | 100 | 100 |
| NCO/OH | 2/1 | 2/1 |

[1] U-1688-1 consists of 1 mol of P368T polyoxypropylene derivative of pentaerythritol (M.W. 368) and four mols of tolylene diisocyanate.
[2] U-1688-2 consists of 2 mols of P368T polyoxypropylene derivative of pentaerythritol (M.W. 368), eight mols of tolylene diisocyanate, and one mol of polypropyleneether glycol Pluracol P-410. (2 mols of U-1688-1 reacted with one of P-410).

| Properties | Formulation | |
|---|---|---|
| | 3 | 4 |
| Curing time: | | |
| Dust free, hr | 1.0 | 1.0 |
| Dry to touch, hr | 1.2 | 1.2 |
| Pot life, hr | 24 | 28 |
| Sward hardness | 60-72 | 58-70 |
| Elongation, percent | 6-8 | 8-10 |
| Impact test—Gardner: | | |
| Direct, in.-lb | 16 | 20 |
| Indirect, in.-lb | 4 | 4 |
| Solvent resistance, hr.: | | |
| Toluene | >4 | >4 |
| Methyl isobutyl ketone | >4 | 3 |

Example 3 (OH-2B)

| Reactants | Moles | Parts | Weight, percent |
|---|---|---|---|
| Polypropyleneether glycol P-410 (M.W. 420) | 2.5 | 1,050 | 21.2 |
| Tolylene diisocyanate, TDI, 80/20; 2,4/2,6 | 5 | 870 | 17.6 |
| Polyoxypropylene derivative of trimethylolpropane (TMP + 3 mols of propylene oxide)-TP-116 (M.W. 308) | 5 | 1,540 | 31.2 |
| 2-Ethoxyethyl acetate | | 740 | 15.0 |
| Xylene | | 740 | 15.0 |
| | | 4,940 | 100.0 |

NOTE.—NCO/OH ratio=10/20=1/2.

PROCEDURE 870 parts of TDI are reacted in a 5-liter vessel with 1050 parts of polypropyleneether glycol P-410 at a temperature not over 60° C. for at least 2 hours. The contents are diluted with 200 parts 2-ethoxyethyl acetate and 200 parts xylene. In this stage, the adduct with two free NCO groups is formed.

In the second stage this adduct is combined with two mols of polyoxypropylene derivative of trimethylolpropane TP-116. 1540 parts of polyol TP-116 are added in one portion with the solvents: 540 parts of 2-ethoxyethyl acetate and 540 parts xylene. The reactants are stirred at 70° C. for 3 hours.

Properties of OH-2B:
  Average molecular weight _____ 1384
  Average equivalent weight _____ 346
  Hydroxyl number _____ 163
  Percent hydroxyl _____ 4.92
Properties of OH-2B solution:
  Non-volatile, percent _____ 70
  Weight per gallon, lb. _____ 9.00
  Viscosity at 25° C., cps. _____ 25,000-30,000

OH-2B IN URETHANE COATINGS

| Composition | Formulation | |
|---|---|---|
| | 5 | 6 |
| Isocyanate-terminated intermediate | NCO-1 | NCO-1 |
| Parts | 140 | 232 |
| Hydroxyl-terminated intermediate | OH-2B | OH-2B |
| Parts | 100 | 100 |
| NCO/OH | 1.2/1.0 | 2.0/1.0 |

| Properties | | |
|---|---|---|
| Curing time: | | |
| Dust free, hr | 1.0 | 1.2 |
| Dry to touch, hr | 2.5 | 2.1 |
| Pot life, hr | 24 | 28 |
| Sward hardness | 40-56 | 48-64 |
| Elongation, percent | 40-60 | 20-40 |
| Tensile strength | 4,000-6,000 | 5,000-7,000 |
| Impact test—Gardner: | | |
| Direct, in.-lbs | 16-20 | 12-16 |
| Indirect, in.-lbs | 4-6 | 2-4 |
| Abrasion resistance, mg./1,000 cycles | 50 | 40 |
| Solvent resistance: | | |
| Toluene | >4 | >4 |
| 2-Ethoxyethyl acetate | >4 | >4 |
| Methyl isobutyl ketone | 3 | >4 |

Chemical resistance and water immersion resistance are excellent. The OH-2B of Example 3 gives a faster curing and a harder, more solvent resistant coating than the OH-2 of Example 1.

Example 4 (OH-2X)

| Reactants | Mols | Parts |
|---|---|---|
| Polypropyleneether glycol, M.W. 600 | 1 | 600 |
| Phenylene diisocyanate | 2 | 320 |
| Monoethylene oxide addition product of TP-116, a polyoxypropylene derivative of trimethylolpropane of M.W. 308 | 2 | 704 |
| 2-ethoxyethyl acetate | | 329 |
| Xylene | | 329 |

Procedure: Same as in Examples 1-3.

Properties:
- NCO/OH _____ 1/2.0
- Average molecular weight _____ 1620
- Average equivalent weight _____ 405
- Hydroxyl number _____ 139
- Percent hydroxyl _____ 4.22

OH-2X IN URETHANE SURFACE COATINGS

When employed as the second component together with NCO-1 or NCO-3 in the NCO/OH proportions of Example 1, OH-2X gives hard urethane films which are more flexible but which have slightly less solvent resistance than the films of Example 1. Chemical resistance and water immersion resistance are excellent.

Example 5 (OH-2Y)

| Reactants | Mols | Parts |
|---|---|---|
| Polypropyleneether glycol, M.W. 420 | 1 | 420 |
| Diphenylmethane-4,4'-diisocyanate | 2 | 496 |
| Addition product of 4 mols of propylene oxide to one mol of pentaerythritol (P-368-T M.W. 368) | 2 | 736 |
| 2-ethoxyethyl acetate | | 550 |
| Xylene | | 550 |

Procedure: Same as in Examples 1-3.

Properties:
- NCO/OH _____ 1/2.5
- Average molecular weight _____ 1656
- Average equivalent weight _____ 276
- Hydroxyl number _____ 203
- Percent hydroxyl _____ 6.16

OH-2Y IN URETHANE SURFACE COATINGS

When employed as the second component together with NCO-1 or NCO-3 in the NCO/OH proportions of Example 1, OH-2Y gives urethane films which are less flexible but which have greater film hardness than the films of Example 1. Chemical resistance and water immersion resistance are excellent.

Example 6 (OH-2Z)

| Reactants | Mols | Parts |
|---|---|---|
| Dipropylene glycol | 1 | 134 |
| TDI (80/20; 2,4/2,6) | 2 | 348 |
| Addition product of 8 mols of propylene oxide to one mol of glycerine (M.W. 550) | 2 | 1,100 |
| 2-ethoxyethyl acetate | | 339 |
| Xylene | | 339 |

Procedure: Same as in Examples 1-3.

Properties:
- NCO/OH _____ 1/2.0
- Average molecular weight _____ 1592
- Average equivalent weight _____ 398
- Hydroxyl number _____ 141
- Percent hydroxyl _____ 4.27

OH-2Z IN URETHANE SURFACE COATINGS

When employed as the second component together with NCO-1 or NCO-3 in the NCO/OH proportions of Example 1, OH-2Z gives urethane films which are less flexible but which have slightly greater solvent resistance than the films of Example 1. Chemical resistance and water immersion resistance are good.

Example 7 (OH-2P)

| Reactants | Mols | Parts |
|---|---|---|
| Dipropylene glycol | 1 | 134 |
| TDI (80/20; 2,4/2,6) | 2 | 348 |
| Addition product of 12 mols of propylene oxide to one mol of pentaerythritol (M.W. 840) | 2 | 1,680 |
| 2-ethoxyethyl acetate | | 285 |
| Xylene | | 285 |

Procedure: Same as in Examples 1-3.

Properties:
- NCO/OH _____ 1/2.5
- Average molecular weight _____ 2160
- Average equivalent weight _____ 360
- Hydroxyl number _____ 156
- Percent hydroxyl _____ 4.73

OH-2P IN URETHANE SURFACE COATINGS

When employed as the second component together with NCO-1 or NCO-3 in the NCO/OH proportions of Example 1, OH-2P give urethane films which are more flexible but which have slightly less solvent resistance than the films of Example 1. Chemical resistance and water immersion resistance are excellent.

Example 8 (OH-2D)

| Reactants | Mols | Parts |
|---|---|---|
| Polypropyleneether glycol, M.W. 750 | 1 | 750 |
| TDI (2,4) | 2 | 348 |
| Addition product of one mol of ethylene oxide to dipropyleneoxide adduct of glycerine (M.W. 249) | 2 | 498 |
| 2-ethoxyethyl acetate | | 342 |
| Xylene | | 342 |

Procedure: Same as in Examples 1-3.

Properties:
- NCO/OH _____ 1/2.0
- Average molecular weight _____ 1596
- Average equivalent weight _____ 399
- Hydroxyl number _____ 141
- Percent hydroxyl _____ 4.27

OH-2D IN URETHANE SURFACE COATINGS

When employed as the second component together with NCO-1 or NCO-3 in the NCO/OH proportions of Example 1, OH-2D give urethane films which are more flexible but which have less solvent resistance than the films of Example 1. Chemical resistance and water immersion resistance are good.

Example 9 (OH-2Q)

| Reactants | Mols | Parts |
|---|---|---|
| Tetrapropylene glycol | 1 | 250 |
| TDI (80/20; 2, 4/2, 6) | 2 | 348 |
| Addition product of 2 mols of propylene oxide and then one mol of ethylene oxide to one mol of hexanetriol (M.W. 300) | 2 | 600 |
| 2-ethoxyethyl acetate | | 257 |
| Xylene | | 257 |

Procedure: Same as in Examples 1–3.
Properties:
  NCO/OH _____ 1/2.0
  Average molecular weight _____ 1224
  Average equivalent weight _____ 306
  Hydroxyl number _____ 183
  Percent hydroxyl _____ 5.55

OH-2Q IN URETHANE SURFACE COATINGS

When employed as the second component together with NCO-1 or NCO-3 in the NCO/OH proportions of Example 1, OH-2Q give urethane films which are less flexible but which have greater solvent resistance than the films of Example 1. Chemical resistance and water immersion resistance are excellent.

Example 10 (OH-2L)

| Reactants | Mols | Parts |
|---|---|---|
| Polypropyleneether glycol, M.W. 420 | 1 | 420 |
| TDI (80/20; 2, 4/2, 6) | 2 | 348 |
| Addition product of 4 mols of propylene oxide to one mol of glycerine (M.W. 360) | 2 | 720 |
| 2-Ethoxyethyl acetate | | 319 |
| Xylene | | 319 |

Procedure: Same as in Examples 1–3.
Properties:
  NCO/OH _____ 1/2.0
  Average molecular weight _____ 1532
  Average equivalent weight _____ 383
  Hydroxyl number _____ 146
  Percent hydroxyl _____ 4.4

OH-2L IN URETHANE SURFACE COATINGS

When employed as the second component together with NCO-1 or NCO-3 in the NCO/OH proportions of Example 1, OH-2L gives urethane films which are slightly less flexible but which have slightly greater solvent resistance than the films of Example 1. Chemical resistance and water immersion resistance are good.

Example 11 (OH-2M)

| Reactants | Mols | Parts |
|---|---|---|
| Polypropyleneether glycol, M.W. 420 | 1 | 420 |
| TDI (80/20; 2, 4/2, 6) | 2 | 348 |
| Addition product of 4 mols of propylene oxide to one mol of trimethylolpropane (M.W. 360) | 2 | 720 |
| 2-ethoxyethyl acetate | | 319 |
| Xylene | | 319 |

Procedure: Same as in Examples 1–3.
Properties:
  NCO/OH _____ 1/2.0
  Average molecular weight _____ 1528
  Average equivalent weight _____ 382
  Hydroxyl number _____ 122
  Percent hydroxyl _____ 3.7

OH-2M IN URETHANE SURFACE COATINGS

When employed as the second component together with NCO-1 or NCO-3 in the NCO/OH proportions of Example 1, OH-2M gives urethane films which are less flexible but which have greater solvent resistance than the films of Example 1. Chemical resistance and water immersion resistance are excellent.

Example 12 (OH-2N)

| Reactants | Mols | Parts |
|---|---|---|
| Polypropyleneether glycol, M.W. 1000 | 1 | 1,000 |
| TDI (80/20; 2, 4/2, 6) | 2 | 348 |
| Pentaerythritol addition product with two propylene oxide units and one ethyleneoxide unit (M.W. 292) | 2 | 584 |
| 2-ethoxyethyl acetate | | 646 |
| Xylene | | 646 |

Procedure: Same as in Examples 1–3.
Properties:
  NCO/OH _____ 1/2.5
  Average molecular weight _____ 1944
  Average equivalent weight _____ 324
  Hydroxyl number _____ 173
  Percent hydroxyl _____ 5.24

OH-2N IN URETHANE SURFACE COATINGS

When employed as the second component together with NCO-1 or NCO-3 in the NCO/OH proportions of Example 1, OH-2N gives urethane films which are more flexible but which have greater film hardness than the films of Example 1. Chemical resistance and water immersion resistance are excellent.

Example 13 (OH-2NX)

| Reactants | Mols | Parts |
|---|---|---|
| Polypropyleneether glycol, M.W. 420 | 1 | 420 |
| TDI (80/20; 2, 4/2, 6) | 2 | 348 |
| Addition product of 4 mols of propylene oxide to one mol of hexanetriol (M.W. 350) | 2 | 700 |
| 2-ethoxyethyl acetate | | 315 |
| Xylene | | 315 |

Procedure: Same as in Examples 1–3.
Properties:
  NCO/OH _____ 1/2.0
  Average molecular weight _____ 1516
  Average equivalent weight _____ 379
  Hydroxyl number _____ 148
  Percent hydroxyl _____ 4.5

OH-2NX IN URETHANE SURFACE COATINGS

When employed as the second component together with NCO-1 or NCO-3 in the NCO/OH proportions of Example 1, OH-2NX gives urethane films which are less flexible but which have greater solvent resistance than the films of Example 1. Chemical resistance and water immersion resistance are excellent.

Example 14 (OH-2EX)

| Reactants | Mols | Parts |
|---|---|---|
| Polypropyleneether glycol, P-410 (M.W. 420) | 1 | 420 |
| TDI (80/20; 2, 4/2, 6) | 2 | 348 |
| Addition product of 18 mols of propylene oxide to one mol of sorbitol (M.W. 1250) | 2 | 2500 |
| 2-ethoxyethyl acetate | | 1091 |
| Xylene | | 1091 |

Procedure: Same as in Examples 1–3.
Properties:
  NCO/OH _____ 1/3.5
  Average molecular weight _____ 3400
  Average equivalent weight _____ 340
  Hydroxyl number _____ 165
  Percent hydroxyl _____ 5.0

OH-2EX IN URETHANE SURFACE COATINGS

When employed as the second component together with NCO-1 or NCO-3 in the NCO/OH proportions of Example 1, OH-2EX gives urethane films which are slightly more flexible but which have slightly less solvent resistance than the films of Example 1. Chemical resistance and water immersion resistance are excellent.

Example 15 (OH-2ET)

| Reactants | Mols | Parts |
|---|---|---|
| Tetrapropylene glycol | 1 | 250 |
| TDI (80/20; 2,4/2,6) | 2 | 348 |
| Addition product of 12 mols of propylene oxide to one mol of dipentaerythritol (M.W. 970) | 2 | 1,940 |
| 2-ethoxyethyl acetate | | 845 |
| Xylene | | 845 |

Properties:
- NCO/OH _____ 1/3.5
- Average molecular weight _____ 2600
- Average equivalent weight _____ 260
- Hydroxyl number _____ 216
- Percent hydroxyl _____ 5.58

OH-2ET IN URETHANE SURFACE COATINGS

When employed as the second component together with NCO-1 or NCO-3 in the NCO/OH proportions of Example 1, OH-2ET gives urethane films which are less flexible but which have slightly greater solvent resistance than the films of Example 1. Chemical resistance and water immersion resistance are excellent.

It is to be understood that the invention is not limited to the exact details of operation or exact compounds shown and described, as obvious modifications and equivalents will be apparent to one skilled in the art, and the invention is therefore to be limited only by the scope of the appended claims.

I claim:

1. An ordered hydroxy-terminated urethane composition prepared sequentially by first mixing and reacting together about one molar proportion of polypropyleneether glycol (a) having a molecular weight between about 134 and 1000, with about two molar proportions of arylene diisocyanate (c) selected from the group consisting of phenylene diisocyanate, tolylene diisocyanate, and diphenylmethane-4,4'-diisocyanate, to produce an isocyanate-terminated polypropyleneether glycol urethane, and then mixing and reacting about one molar proportion of the thus-formed isocyanate-terminated urethane with about two molar proportions of polyether polyol (b) have the formula:

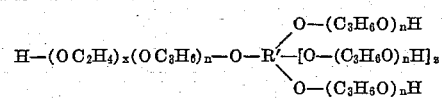

wherein R' with attached oxygen atoms represents a polyhydric lower-aliphatic alcohol radical; $x$ is a number from zero to one; $z$ is a number from zero to three; and $n$ is a number from zero to three, provided that when $z=0$, at least one $n$ is at least one; when $z=1$, at least two $n$'s are at least one; when $z=2$, at least three $n$'s are at least one; and when $z=3$, at least four $n$'s are at least one; to produce the desired order hydroxy-terminated urethane composition, the initial reaction temperature in the first step of the reaction being not greater than about sixty degrees centigrade.

2. An ordered hydroxy-terminated urethane composition according to claim 1 wherein the polypropyleneether glycol (a) has a molecular weight not exceed an average of about 750, $n$ does not exceed an average of two, and $n$ has a value of at least one in each occurrence.

3. An ordered hydroxy-terminated urethane composition according to claim 2, wherein the arylene diisocyanate (c) is tolylene diisocyanate and the polyether polyol (b) is an alkylene oxide addition product of trimethylolpropane.

4. An ordered hydroxy-terminated urethane composition according to claim 2 wherein the arylene diisocyanate (c) is tolylene diisocyanate and the polyether polyol (b) is a pentaerythritol alkylene oxide addition product.

5. An ordered hydroxy-terminated urethane composition according to claim 2 wherein the arylene diisocyanate (c) is tolylene diisocyanate and the polyether polyol (b) is a hexanetriol alkylene oxide addition product.

6. An ordered hydroxy-terminated urethane composition according to claim 2 wherein the arylene diisocyanate (c) is tolylene diisocyanate and the polyether polyol (b) is a glycerine alkylene oxide addition product.

7. An ordered hydroxy-terminated urethane composition according to claim 1 wherein the average equivalent weight is between about 200 and about 400.

8. A solution of an ordered hydroxy-terminated urethane composition according to claim 1 in a surface coating solvent which is non-reactive therewith.

9. A urethane coating composition including as one component an ordered hydroxy-terminated urethane composition according to claim 1 and including an organic polyisocyanate as a second component.

10. A coating composition according to claim 9 including an organic surface coating solvent which is non-reactive with both the components of the coating composition and their polyurethane reaction product.

11. A process for producing an ordered hydroxy-terminated urethane composition according to claim 18, wherein the polypropyleneether glycol (a) has a molecular weight not greater than about 750, $n$ does not exceed an average of two, and $n$ has a value of at least one in each occurrence.

12. A process for producing an ordered hydroxy-terminated urethane composition according to claim 11, wherein the arylene diisocyanate (c) is tolylene diisocyanate and the polyether polyol (b) is an alkylene oxide addition product of trimethylolpropane.

13. A process for producing an ordered hydroxy-terminated urethane composition according to claim 11, wherein the arylene diisocyanate (c) is tolylene diisocyanate and the polyether polyol (b) is a pentaerythritol alkylene oxide addition product.

14. A process for producing an ordered hydroxy-terminated urethane composition according to claim 11, wherein the arylene diisocyanate (c) is tolylene diisocyanate and the polyether polyol (b) is a hexanetriol alkylene oxide addition product.

15. A process for producing an ordered hydroxy-terminated urethane composition according to claim 11, wherein the arylene diisocyanate (c) is tolylene diisocyanate and the polyether polyol (b) is a glycerine alkylene oxide addition product.

16. A novel ordered hydroxy-terminated polyether-based urethane composition produced by mixing and reacting together about one molar proportion of a polypropyleneether glycol (a), having a molecular weight between 134 and 1000, and about two molar proportions of an arylene diisocyanate (c) selected from the group consisting of tolylene diisocyanate, phenylene diisocyanate, and diphenylmethane-4,4'-diisocyanate, to produce a polyether-based isocyanate-terminated urethane intermediate adduct, and then mixing and reacting together about one molar proportion of the thus-produced adduct with about two molar proportions of a polyol (b) which is a propylene oxide addition product of a polyhydric lower-aliphatic alcohol having at least three and not more than six hydroxy groups in the molecule.

17. A process for the production of a novel ordered hydroxy-terminated polyether-based urethane composition, which includes the step of mixing and reacting together about one molar proportion of a polypropyleneether glycol (a), having a molecular weight between about 134 and 1000, and about two molar proportions of an arylene diisocyanate (c) selected from the group consisting of tolylene diisocyanate, phenylene diisocyanate, and diphenylmethane-4,4'-diisocyanate, to produce a polyether-based isocyanate-terminated urethane intermediate adduct, and then mixing and reacting together about one molar proportion of the thus-produced adduct with about two molar proportions of a polyol (b) which is a propylene oxide addition product of a polyhydric lower-aliphatic alcohol having at least three and not more than six hydroxy groups in the molecule.

18. A process for the sequential production of an ordered hydroxy-terminated urethane composition which includes the steps of first mixing and reacting together about one molar proportion of a polypropyleneether glycol (a) having a molecular weight between about 134 and 1000 with about two molar proportions of arylene diisocyanate (c) selected from the group consisting of phenylene diisocyanate, tolylene diisocyanate, and diphenylmethane-4,4'-diisocyanate, to produce an isocyanate-terminated polypropyleneether glycol urethane and then mixing and reacting about one molar proportion of the thus-produced isocyanate-terminated urethane with about two molar proportions of polyether polyol (b) having the formula:

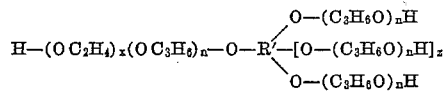

wherein R' with attached oxygen atoms represents the radical of a polyhydric lower-aliphatic alcohol; $x$ is a number from zero to one; $z$ is a number from zero to three; and $n$ is a number from zero to three, provided that when $z=0$, at least one $n$ is at least one; when $z=1$, at least two $n$'s are at least one; when $z=2$, at least three $n$'s are at least one; and when $z=3$, at least four $n$'s are at least one; to produce the desired ordered hydroxy-terminated urethane composition, the initial reaction temperature in the first step of the reaction being not greater than about sixty degrees centigrade.

References Cited in the file of this patent

UNITED STATES PATENTS

| | | |
|---|---|---|
| 2,814,605 | Stilmar | Nov. 26, 1957 |
| 2,866,774 | Price | Dec. 30, 1958 |
| 2,871,226 | McShane | Jan. 27, 1959 |
| 2,897,181 | Wendemuth | July 28, 1959 |

FOREIGN PATENTS

| | | |
|---|---|---|
| 206,295 | Australia | Feb. 10, 1955 |
| 205,456 | Australia | Jan. 4, 1957 |
| 769,091 | Great Britain | Feb. 27, 1957 |

UNITED STATES PATENT OFFICE
CERTIFICATE OF CORRECTION

Patent No. 3,049,516                           August 14, 1962

Adolfas Damusis

It is hereby certified that error appears in the above numbered patent requiring correction and that the said Letters Patent should read as corrected below.

Column 1, line 24, for "poly-ether-based" read -- polyether-based --; column 3, line 25, after "addition" insert -- procedure --; column 4, line 35, for "P-140" read -- P-410 --; column 11, after the table in Example 15, insert -- Procedure: Same as in Examples 1-3. --; line 60, for "order" read -- ordered --.

Signed and sealed this 16th day of April 1963.

(SEAL)
Attest:

ERNEST W. SWIDER
Attesting Officer

DAVID L. LADD
Commissioner of Patents